(12) United States Patent
Levine (10) Patent No.: US 8,104,047 B2
(45) Date of Patent: Jan. 24, 2012

(54) PROCESSING ACCESS REQUESTS FOR A DISK DRIVE

(75) Inventor: Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 12/122,784

(22) Filed: May 19, 2008

(65) Prior Publication Data

US 2009/0288103 A1    Nov. 19, 2009

(51) Int. Cl.
*G06F 3/00* (2006.01)
*G06F 13/00* (2006.01)
(52) U.S. Cl. .......................... 719/321; 711/167; 711/154
(58) Field of Classification Search .................. 719/322, 719/321; 710/1; 711/167, 154
See application file for complete search history.

(56) References Cited

U.S. PATENT DOCUMENTS

| | | | |
|---|---|---|---|
| 5,668,971 A * | 9/1997 | Neufeld | 711/111 |
| 6,170,042 B1 | 1/2001 | Gaertner et al. | |
| 6,417,979 B1 * | 7/2002 | Patton et al. | 360/75 |
| 6,553,476 B1 | 4/2003 | Ayaki et al. | |
| 6,993,624 B2 | 1/2006 | Hall | |
| 7,620,046 B2 * | 11/2009 | Ronciak et al. | 370/392 |
| 7,957,398 B1 * | 6/2011 | Yochai et al. | 370/395.42 |
| 2003/0188092 A1 | 10/2003 | Heath et al. | |

OTHER PUBLICATIONS

Shi-Wu Lo, Multi-disk scheduling for time-constrained requests in RAID-0 devices, 2005.*

* cited by examiner

*Primary Examiner* — Lechi Truong
(74) *Attorney, Agent, or Firm* — Yee & Associates, P.C.; David A. Mims, Jr.

(57) ABSTRACT

A computer implemented method, apparatus, and computer usable program code for managing access requests for access to a disk drive. A placement of a set of disk heads tracked and an expected time to process already queued access requests by the disk drive are tracked. In response to receiving the request to access the disk drive at a device driver, a determination is made as to whether the request can be completed within a specified amount of time associated with the request without sending the access request to the disk drive. The request is placed, by the device driver, in a queue for execution if a determination is made that the access request can be completed within the specified amount of time.

17 Claims, 5 Drawing Sheets

FIG. 7 ved data
PROCESSING ACCESS REQUESTS FOR A DISK DRIVE

BACKGROUND OF THE INVENTION

1. Field of the Invention

The present invention relates generally to an improved data processing system and more specifically to a method and apparatus for processing data. Still more particularly, the present disclosure relates to a computer implemented method, apparatus, and computer usable program code for managing access requests for a disk drive.

2. Description of the Related Art

Optimizing access to devices, such as, for example, disk drives in a data processing system may increase the performance of the data processing system. Advances have been made in the optimization execution of access requests to a disk drive. These access requests include, for example, read requests and write requests. A device driver or controller for a disk drive may often process numerous access requests at any given point in time. These access requests may specify a set of physical disk blocks in a disk drive. A set as used herein refers to one or more items. For example, a set of disk blocks refers to one or more disk blocks. The seek time, settle time, and rotational latency present in executing an access request may make processing a request inefficient at times.

Different techniques are currently present for processing these access requests. For example, one technique may involve accessing disk blocks for an access request in the order in which the request specifies disk blocks. Another methodology may include processing access requests in the order in which the access requests were received from the operating system. These types of techniques for processing access requests may be inefficient. Therefore, it would be advantageous to have an improved computer implemented method, apparatus, and computer usable program code for processing access requests for a disk drive.

BRIEF SUMMARY OF THE INVENTION

The illustrative embodiments provide a computer implemented method, apparatus, and computer usable program code for managing access requests for access to a disk drive. A placement of a set of disk heads tracked and an expected time to process already queued access requests by the disk drive are tracked by a device driver. In response to receiving the request to access the disk drive at the a device driver, a determination is made as to whether the request can be completed within a specified amount of time associated with the request without sending the access request to a disk drive controller for the disk drive. The request is placed, by the device driver, in a queue for execution if a determination is made that the access request can be completed within the specified amount of time.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
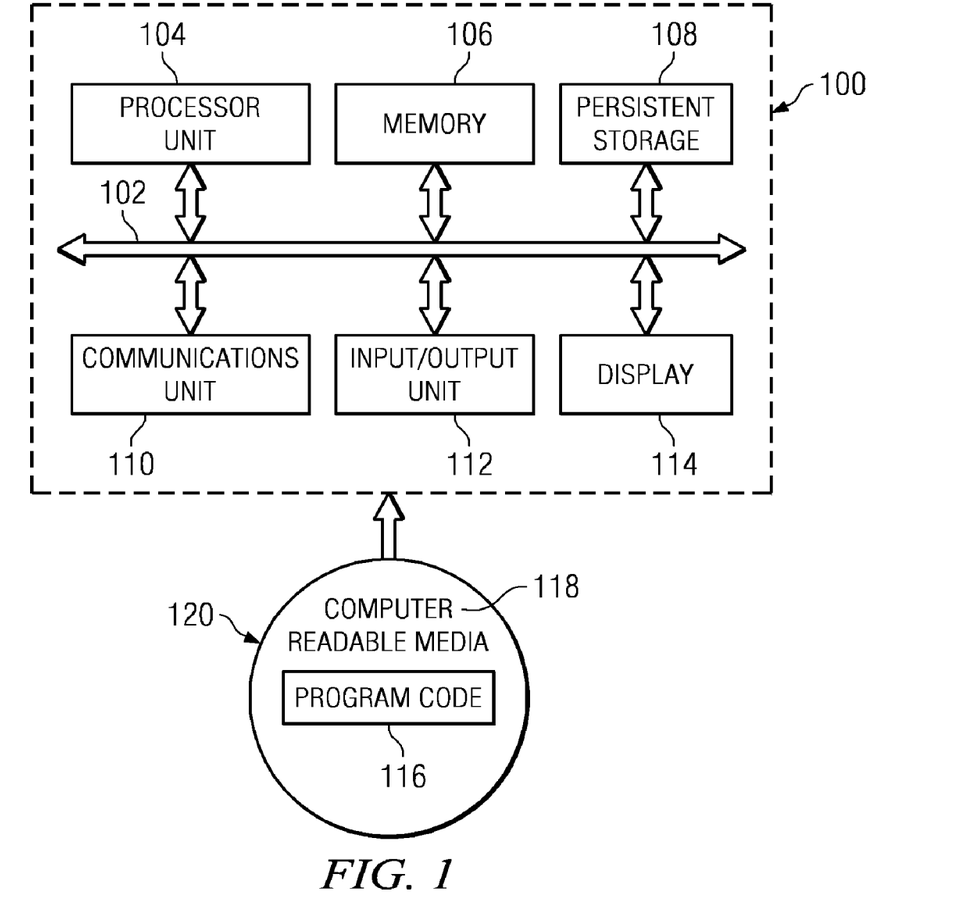
FIG. 1 is a diagram of a data processing system in accordance with an illustrative embodiment.

Turning now to FIG. 1, a diagram of a data processing system is depicted in accordance with an illustrative embodiment. Data processing system 100 is an example of one physical device in which different advantageous embodiments may be implemented. The different advantageous embodiments may be implemented in other devices in which storage systems may be present. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

Figure 2:
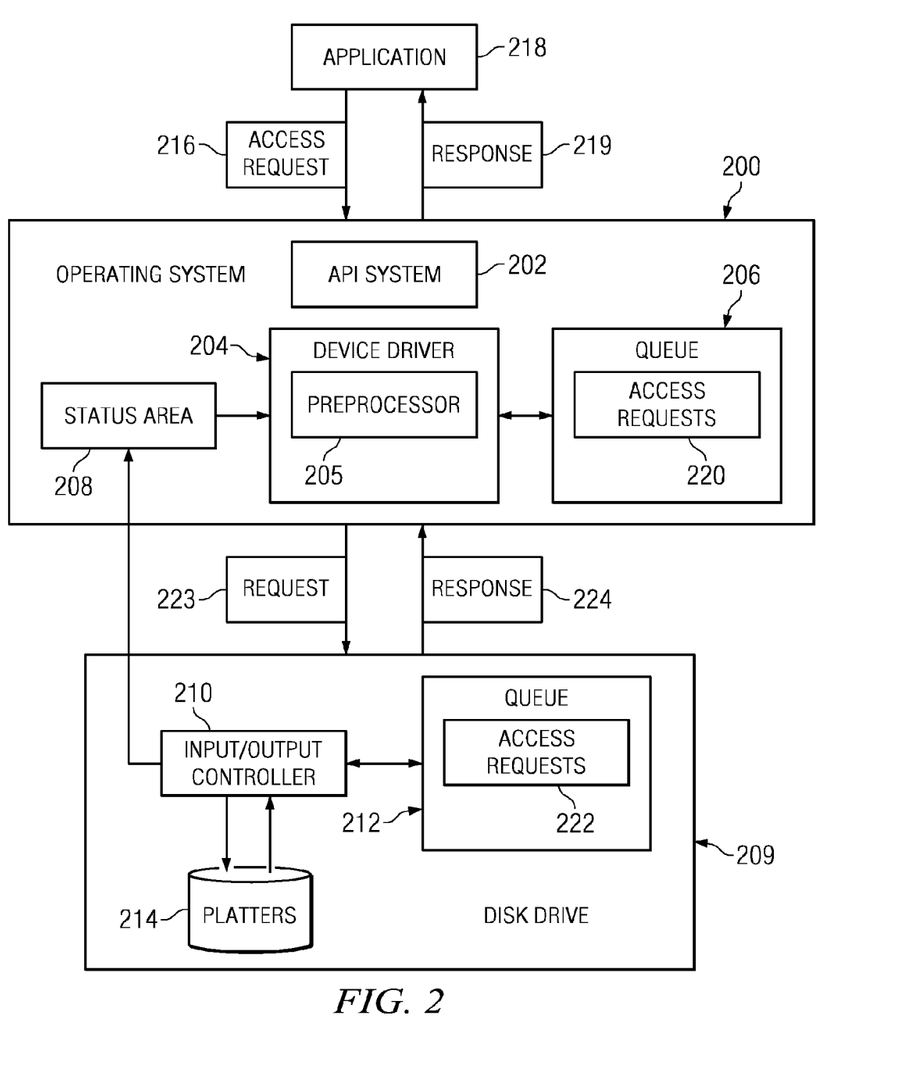
FIG. 2 is a block diagram illustrating components used to manage access requests in accordance with an illustrative embodiment.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102. The different illustrative embodiments recognize that current techniques may increase processing time and user resources by send all access requests to input/output controller 210 for processing. The different illustrative embodiments provide a computer implemented method, apparatus, and computer usable program code for processing access requests. The expected time to complete requests by a storage device, such as a disk drive may be tracked. In response to receiving a request to access a disk drive at a device driver, a determination may be made as to whether the request can be completed within the specified amount of time associated with the request without sending the request to the disk drive or a disk drive controller for the disk drive. The disk drive controller may be a local or remote controller for the disk drive. The device driver may place the request in the queue for execution if a determination is made that the request can be completed within the specified period of time. In this manner, access requests may be preprocessed without actually sending the request to disk drive controller or the disk drive. Only requests that have been identified as being capable of being completed within the specified period of time are sent to the disk drive for processing.

With reference now to FIG. 2, a block diagram illustrating components used to manage access requests is depicted in accordance with an illustrative embodiment. In this example, operating system 200 includes application programming interface system 202, device driver 204, preprocessor 205, queue 206, and status area 208.

Operating system 200 manages computer resources and provides an interface to the resources. Operating system 200 may be implemented using any currently available operating system. For example, operating system 200 may be implemented using a Windows Vista operating system, a Unix operating system, or an Advanced Interactive Executive (AIX®) operating system. Windows Vista operating systems are available from Microsoft Corporation. Unix operating systems may be any operating system certified to the single Unix specification. AIX® operating systems may be available from International Business Machines Corporation. Windows Vista is a trademark of Microsoft Corporation, Unix is a registered trademark of the Open Group, and AIX is a registered trademark of International Business Machines Corporation. Application programming interface system 202 may be a set of application programming interfaces. A set as used herein refers to one or more items. For example, a set of application programming interfaces is one or more application programming interfaces.

Disk drive 209 includes input/output controller 210, queue 212, and platters 214. Input/output controller 210 also may be referred to as a disk drive controller when used with a disk drive and may read and/or write data on platters 214. In this illustrative example, each platter in platters 214 is divided into concentric circular tracks and is divided into sectors. The intersection of the circular tracks and the sectors on one side of the platter form disk blocks used to store the information that may be accessed by input/output controller 210. A cylinder represents a collection of tracks aligned through a stack of platters within platters 214 in disk drive 209. The number of cylinders in disk drive 209 equals the number of tracks on a single platter within platters 214. Data may be written to and read from a surface of a platter in platters 214 through a device drive head. Each platter has two sides with each side having a disk drive head for reading and writing data from one side of the platter. Input/output controller 210 controls the reading and writing of data. Disk drive 209 is an example of a persistent storage that may be present in persistent storage 108 in FIG. 1.

Application programming interface system 202 may receive access request 216 from application 218. In these examples, access request 216 takes the form of an input/output (I/O) request. This type of request may be, for example, a request to read data or write data to disk drive 209. An access request may be, for example, a read request or a write request to a device such as disk drive 209. Application 218 may be any software component executing in the data processing system. Application 218 may be, for example, a word processing program, a data base application, a spreadsheet program, a virus scanning program, or some other suitable software component.

Application programming interface system 202 returns response 219 in response receiving to access request 216 from application 218. Response 219 may include a result of the processing of access request 216. For example, response 219 may confirm that access request 216 has been processed successfully or has failed.

In the illustrative example, application programming interface system 202 may call a function within device driver 204 with response to receiving access request 216. In the different illustrative embodiments, application programming interface system 202 may call preprocessor 205. Preprocessor 205 determines whether access request 216 can be completed within a selected amount of time. Preprocessor 205 is an operating system component that determines whether access requests can be can be completed within the specified amount of time associated with the access request, without sending the access request to input/output controller 210. If access request 216 can be performed or completed within the selected amount of time, access request 216 is placed into access requests 220 within queue 206. In these examples, access requests 220 in queue 206 are requests that have not yet been sent to disk drive 209 for processing.

Device driver 204 sends access request 223 from access requests 220 to input controller 210 for placement into access requests 222 in queue 212. Queue 212 also may be referred to as a request queue in these illustrative examples. In turn, input/output controller 210 may select an access request from access request 222 for execution. In these examples, input/output controller 210 may select the access request based on a first in-first out (FIFO) basis.

Input/output controller 210 returns response 224, which may include the data responsive to access request 223. Alternatively, response 224 may include an error code if the request is not processed.

In the different advantageous embodiments, preprocessor 205 within device driver 204 may determine whether an access request in access requests 220 in queue 206 can be completed within a selected amount of time without actually sending an access request to input/output controller 210. This controller may be a local or remote controller for the disk drive. Also, the determination is made without sending the access request the disk drive. Thus, if preprocessor 205 determines that access request 216 cannot be completed in the selected amount of time, the use of time and resources in the hard drive to receive and store the access request within queue 212 may be avoided.

In these different advantageous embodiments, preprocessor 205 may predict the amount of time needed to complete access request 216. Completion of an access request may be the time needed to obtain the information responsive to access request 216. In these examples, the amount of time needed to complete access request 216 may be the amount of time that passes from placing access request 216 in access requests 220 until response 224 is received. In another illustrative example, the time to complete access request 223 may be the time between when access request 216 is sent to input/output controller 210 and when response 224 is received. In yet another non limiting example, an amount of time to complete and access request may be the time from when access request 216 is received from application 218 to the time response 219 is returned to application 218.

In the different illustrative examples, the prediction of the amount of time needed to complete an access request may be performed using the location of disk heads and identifying blocks from the different requests that have been queued for processing by disk drive 209. With this information, preprocessor 205 may predict the amount of time needed to perform each access request. One manner in which this prediction may be made is described in more detail in FIG. 6 below.

In these examples, already queued access requests for processing may include access requests 220 in queue 206 and access requests 222 in queue 212. Preprocessor 205 may predict the amount of time needed to complete access requests 220 in queue 206. Further, preprocessor 205 also may predict the amount of time needed to complete access requests 222.

In other illustrative examples, preprocessor 205 may predict the time needed to complete access requests 220. The time needed to complete access requests 222 may be predicted by input/output controller 210 and returned in status area 208 for use by preprocessor 205.

In these different illustrative embodiments, if preprocessor 205 determines that access request 216 cannot be completed within the selected amount of time, access request 216 may be discarded, and response 218 may be returned indicating that access request 216 cannot be completed in the selected amount of time. In this situation, application 218 may resubmit an access request at a later time. In other embodiments, preprocessor 205 may return to a requester access request, specifying a projected amount of time in which the access request can be completed, wherein the projected amount of time is greater than the specified amount of time in the access request Alternatively, preprocessor 205 in device driver 204 may determine whether access request 216 can be completed within the selected amount of time if access request 216 is placed in a different order than normally used in queue 206. For example, input/output request may be placed into queue 206 based on the first-in-first-out (FIFO) order. With this type of queue ordering system, preprocessor 205 may determine whether placing access request 216 in an earlier position within queue 206 can result in completion of access request 216 within the selected amount of time.

Further, in making this analysis preprocessor 205 also may take into account whether access requests 220 within queue 206 also require processing within a selected amount of time. For example, some requests within access request 220 may not require processing within a selected period of time. Also, different access requests within access requests 220 may have different amounts of time by which those requests should be completed.

In these examples, the selected amount of time may be designated in a number of different ways. For example, a selected amount of time may be designated based on some performance metric set for operating system 200. In this implementation, the selected time may be designated for all access requests or some selected types of access requests. In other illustrative embodiments, status area 208 may designate the selected amount of time within access request 216.

In alternative embodiment, access request 216 may be received at a separate controller from a primary processor. This process may be, for example, another processor in processor unit 104 in addition the primary processor. This controller can include the processes of preprocessor 205 for managing access requests as described above. This controller is a separate controller from input/output controller 210 in these examples. In one example, device driver 204 with preprocessor 205 may execute on this controller.

Figure 3:
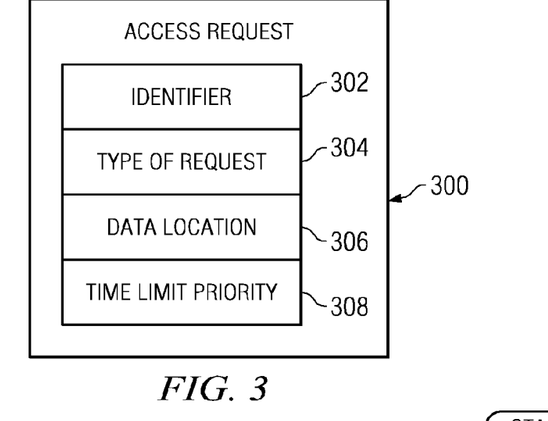
FIG. 3 is a block diagram illustrating an access request in accordance with an illustrative embodiment.

Turning now to FIG. 3, a block diagram illustrating an access request is depicted in accordance with an illustrative embodiment. In this example, access request 300 is an example of access request 216 in FIG. 2. As depicted, access request 300 includes identifier 302, type of request 304, disk blocks 306, and time limit priority 308.

Identifier 302 may be used to uniquely identify access request 300. Identifier 302 may be used to return information corresponding to the access request to the requestor. Type of request 304 may indicate whether access request 300 is read request or a write request in these examples. Data location 306 may include an identification of the virtual partition from which data is to be accessed. Further, data 306 also may include the amount of data to be accessed. The access request may be a set of access requests with different locations and sizes. The local volume manager in an operating system may use a map associating virtual partition to the actual physical locations on the disk drive to allocate disk space. The volume manager may use the map to convert access request 300 into one that specifies the actual physical disk blocks for the disk drive. Time limit priority 308 may indicate the amount of time for completing access request 300.

Figure 4:
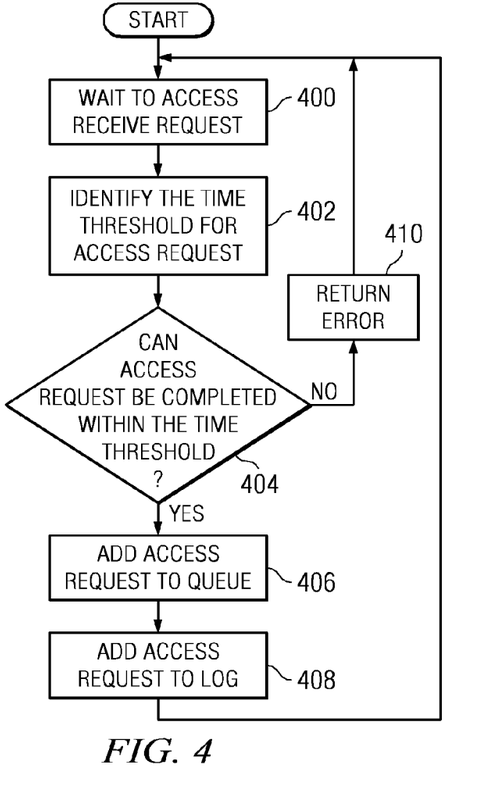
FIG. 4 is a flowchart of a process for determining whether an access request can be processed within a selected amount of time in accordance with an illustrative embodiment.

With reference now to FIG. 4, a flowchart of a process for determining whether an access request can be processed within a selected amount of time is depicted in accordance with an illustrative embodiment. The process illustrated in FIG. 4 may be implemented in a software component such as preprocessor 205 in FIG. 2.

The process begins by waiting to receive an access request (step 400). In response to receiving an access request, the time threshold for the access request is identified (step 402). This time threshold is the amount of time to complete the access request. In these examples, the process may identify the time threshold from the access request. For example, a time limit priority, such as time limit priority 308 in access request 300 in FIG. 3, may be examined. In other examples, this time threshold may be one that is preset for all access requests. In other illustrative examples, the time threshold may be set based on the type of request, the type of application, amount of resources available in the operating system, or some other suitable criteria. This time threshold may differ for different requests depending on the particular implementation.

The process then determines whether the access request can be completed within the time threshold (step 404). If the access request can be completed within the time threshold, the process adds the access request to a queue (step 406). In these examples, the queue may be queue 206 in operating system 200 in FIG. 2. The process then adds the access request to a log or a data area that may contain the individual access request, the expected time for each of the individual access requests, the accumulated access times for a set of access requests, and the placement of the heads at the completion of the individual access requests or the placement of heads at the completion of all the access request. (step 408) with the process then returning to step 400 to wait for another access request to be received. This information may be used when a new request is made to reduce the overhead of calculating the time to process requests that are already queued. The information may also be used or updated when requests are reorder.

With reference to step 404, if the access request cannot be completed within the time threshold, an error is returned (step 410) with the process then returning to step 400 as described above. In step 410, this error may be returned to the application originating the access request. This error may be placed in a response, such as response 218 in FIG. 2.

Figure 5:
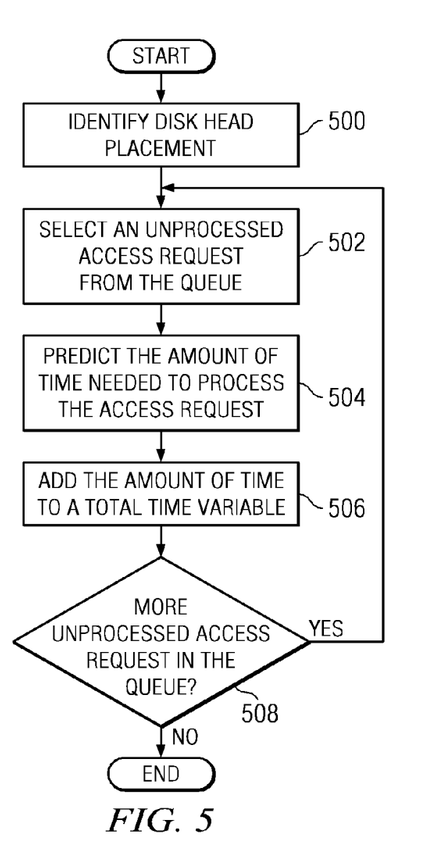
FIG. 5 is a flowchart of a process used to predict the amount of time needed to complete a request in accordance with an illustrative embodiment.

With reference next to FIG. 5, a flowchart of a process used to predict the amount of time needed to complete a request is depicted in accordance with an illustrative embodiment. The process illustrated in FIG. 5 may be implemented in a software component, such as preprocessor 205 in FIG. 2.

The process begins by identifying the disk head placement (step 500). This disk head placement may be identified by querying a controller in the storage device such as input/output controller 210 in FIG. 2. By identifying the disk head placement, the process may track or predict the amount of time needed to process an access request that is received. As additional access requests are received, the amount of time needed to track the access request may be predicted based on all of the pending access requests from the initial or identified disk head placement.

The process then selects an unprocessed access request from the queue (step 502). In step 502, an unprocessed access request may be selected based on the order in which the access request may be processed. Step 502 may select the first access request to be processed from the queue in this example.

The process then predicts the amount of time needed to process the access request (step 504). The process then adds the amount of time predicted to process the access request to a total time variable (step 506). This variable contains the total amount of time predicted to process the access request. A determination is made as to whether an unprocessed access request is still present in the queue (step 508). If an unprocessed access request is still present, the process returns to step 502 to select the unprocessed access request from the queue.

If additional unprocessed access requests are not present in the queue, the process terminates. At this point, the total time variable includes the time predicted to process all of the access requests present in the queue. In these examples, this process may be performed for queue 206 and queue 212 by the preprocessor.

At some point in time, the preprocessor function may request a current placement of the disk head. Updating this information may be needed from time to time because the execution and movement of disk heads may differ from what is predicted. In these examples, the identification of the need placement may be made each time process 500 is initiated. In some illustrative examples, this process may be performed only for queue 206 with the amount of time predicted to process access request 222 being provided by input/output controller 210. In some embodiments, input/output controller 210 may update a data area to contain the information it is able to determine. This may be done using DMA to write to data area reserved for that purpose. The updates may be at specific frequencies, which can be used to determine the accuracy of the data provided.

The data area may contain the individual access requests that the controller is currently processing, the expected time for each of the individual access requests, the accumulated access times for a set of access requests, and the placement of the heads at the completion of the individual access requests or the placement of heads at the completion of all the access requests. In another embodiment, the data area may contain a subset of the information it has available, such as, for example, the current placement of the heads, the expected time to complete the operation in process.

The information provided by the controller may be used along with the information previously gathered or logged to predict the time to process the new request. In another embodiment, only statistical data may be used to determine the expected time to process a set of requests. The statistical data may include information such as request sizes, sequential access, random accesses, and number of requests.

There are various ways to improve the accuracy of the predicted execution times. One way is to have a table that is provided by the manufacturer that identifies the seek/settle time between any two tracks. Other tables could be developed by actual measurements for real accesses that include the complete time from when a request is issued from an application to when the application receives the acknowledgement that the access is completed. Other approaches include, for example, programmatic methodologies that have times for each step of the process and include detailed hardware knowledge such as the rotation speed, the density of the data on the track, skew between cylinders, and other suitable parameters. There could also be contingencies added to allow for a maximum settle time.

Figure 6:
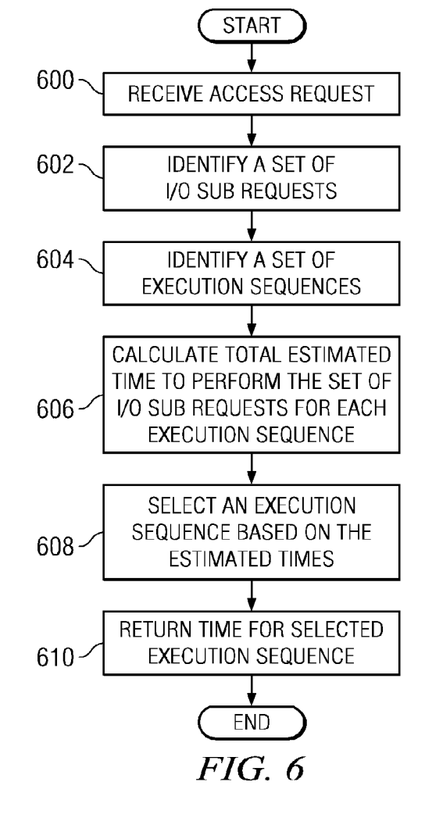
FIG. 6 is a flowchart of a process to predict a time needed to complete an access request in accordance with an illustrative embodiment.

With reference now to FIG. 6, a flowchart of a process to predict a time needed to complete an access request is depicted in accordance with an illustrative embodiment. The process illustrated in FIG. 6 is a more detailed illustration of step 504 in FIG. 5. This process may be performed by a preprocessor and/or input/output controller for a disk drive depending on the particular implementation.

The process begins by receiving the access request for which a prediction of time to complete is needed (step 600). The process identifies a set of input/output sub-requests from the access request (step 602).

In these examples, an input/output sub-request represents a request to read data or write data from a disk block within a group of adjacent disk blocks on the same cylinder. The data subject to an access request may be scattered through the different platters in a set of adjacent disk blocks that may be located along the same cylinder. In other words, each input/output sub-request may be a request to read data or write data from a set of adjacent disk blocks along the same cylinder. In other words, each input/output sub-request specifies a set of disk blocks that are configured next to each other without any gaps between the disk blocks on the same tract and the same side of a disk platter in these examples.

The process then identifies a set of execution sequences from the identified set of input/out sub-requests (step 604). An execution sequence represents an order in which the identified set of input/output sub-requests may be performed to access the different disk blocks as specified in each input/output sub-request. The process then calculates the total estimated time to perform the set of input/output sub-requests for each identified execution sequence (step 606). The process then selects an execution sequence from the set of execution sequences based on the estimates times (step 608). In these examples, the execution sequence selected may be the one having the shortest amount of time needed to complete. The process then returns the time for the selected execution sequence (step 610) with the process terminating thereafter.

Figure 7:
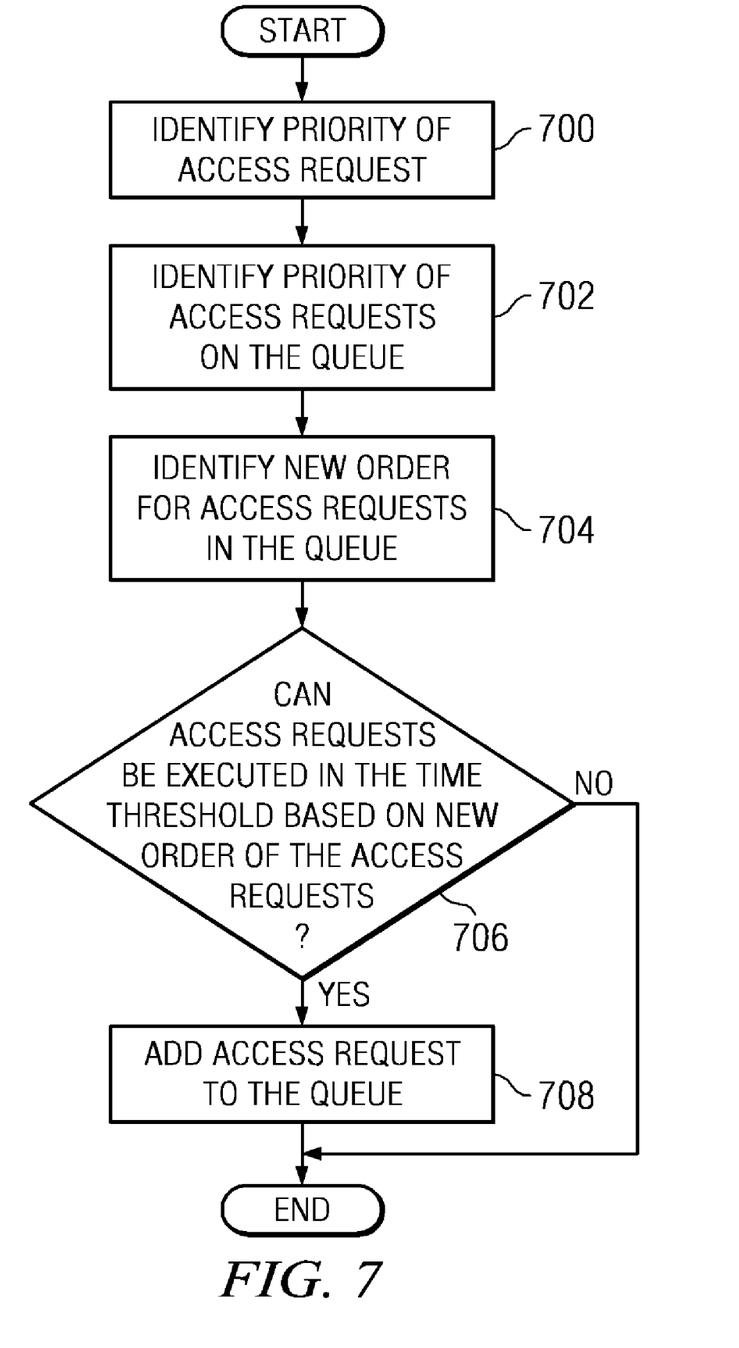
FIG. 7 is a flowchart of processing an access request that cannot be completed in a selected amount of time in accordance with an illustrative embodiment.

With reference to FIG. 7, a flowchart of processing an access request that cannot be completed in a selected amount of time is depicted in accordance with an illustrative embodiment. The process illustrated in FIG. 7 provides an alternative process step to step 410 in FIG. 4. Instead of returning an error immediately, a determination as to whether a re-ordering of requests in a queue may result in the access request being processed within the selected amount of time.

The process identifies the priority of the access request (step 700). This priority may be one based on the identification of the application, the type of request as set by the application, or some other suitable criteria. The priority of the access requests in a queue are then identified (step 702). A new order for the access requests in the queue including the access requests being evaluated is identified (step 704). In identifying a new order for the access requests in the queue, the access request being evaluated may be placed ahead of other requests in the queue based on the priority of the access request. This position of the access request is used to determine whether the request can be processed within the selected amount of time.

A determination is then made as to whether the access requests can be executed in the time threshold based on the new order of the access requests (step 706). In step 706, this determination may be made for all of the access requests that have a requirement for processing or completion within the selected amount of time. In some cases, some access requests may not need to be competed within a selected amount of time. If all of the access requests can be executed within the time threshold based on the order, the access request is added to the queue (step 708). Step 708 also re-orders the queue as identified in step 704 with the process terminating thereafter. If the access request cannot be executed in the time threshold, the process terminates and an error may then be sent.

Thus, the different illustrative embodiments provide a computer implemented method, apparatus, and computer usable program code for processing access requests. In the different illustrative embodiments, placement of a set of disk heads and an expected time to process or to queue requests by the disk drive may be tracked. In response to receiving a request to access the disk drive at a device driver, a determination may be made as to whether the request can be completed within the specified period of time associated with the request without sending the request to disk drive controller or the disk drive. The device driver may place the request in a queue for execution if a determination is made that the request can be completed within the specified period of time. The different illustrative embodiments allow for managing requests without actually sending requests to the disk drive. In this manner, the time and resources used to send a request and process the request in a disk drive may be avoided when the request may not be executed.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the different illustrative examples are directed towards processes implemented with a hard disk drive in the form of a magnetic disk drive, the different advantageous embodiments may be applied to other types of storage systems in which disk heads may be present.

For example, the disk head may be a disk head for an optical disk drive system. Also, the different illustrative embodiments also may be applied to other types of storage devices including solid state storage devices in which access times may be predicted. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing access requests for access to a disk drive, the computer implemented method comprising:
    tracking, by a device driver, a placement of a set of disk heads;
    tracking, by the device driver an expected time for the disk drive to process access requests already queued in a queue at the disk drive;
    responsive to receiving, at the device driver, a particular access request to access the disk drive, determining whether the particular access request can be completed within a specified amount of time without sending the particular access request to a disk drive controller for the disk drive;
    adding, by the device driver, the particular access request to the queue if a determination is made that the particular access request can be completed within the specified amount of time;
    responsive to a determination that the particular access request cannot be completed within the specified amount of time without sending the particular access request to the disk drive, sending an error message to an access requestor sending the particular access request; and
    returning to a requestor the particular access request, specifying a projected amount of time in which the particular access request can be completed, wherein the projected amount of time is greater than the specified amount of time.

2. The computer implemented method of claim 1 further comprising:
    responsive to an absence of a determination that the particular access request can be completed within the specified amount of time without sending the particular access request to the disk drive, determining whether the particular access request can be completed within the specified amount of time if the particular access request is placed within the queue in a location based on a priority of the particular access request and a priority of each access request already on the queue without sending the particular access request to the disk drive.

3. The computer implemented method of claim 2 further comprising:
    placing the particular access request in the location within the queue if the particular access request can be completed within the specified amount of time by placing the particular access request in the location.

4. The computer implemented method of claim 1, wherein the queue is a request queue in the disk drive and wherein the adding step comprises:
    sending, by the device driver, the particular access request to the disk drive controller for placement in the request queue if a determination is made that the particular access request can be completed within the specified amount of time.

5. The computer implemented method of claim 1, wherein the tracking step and the determining are executed by an operating system component that determines whether a particular access request can be can be completed within the specified amount of time, without sending the particular access request to the disk drive controller.

6. The computer implemented method of claim 1 further comprising:
    receiving the particular access request from an application at a processor that is separate from the disk drive controller, wherein the device driver executes on the processor.

7. A data processing system comprising:
    a bus;
    a communications unit connected to the bus;
    a storage device connected to the bus; wherein the storage device includes computer usable program code; and
    a processor unit connected to the bus, wherein the processor unit executes the computer usable program to track, by a device driver, a placement of a set of disk heads and an expected time for a disk drive to process access requests already queued in a queue at the disk drive; determine, responsive to receiving, at the device driver, a particular access request to access the disk drive, whether the particular access request can be completed within a specified amount of time without sending the particular access request to a disk drive controller for the disk drive; add, by the device driver, the particular access request to the queue if a determination is made that the particular access request can be completed within the specified amount of time; send an error message to an access requestor sending the particular access request in response to a determination that the particular access request cannot be completed within the specified amount of time without sending the particular access request to the disk drive; and return to a requestor the particular access request, specifying a projected amount of time in which the particular access request can be completed, wherein the projected amount of time is greater than the specified amount of time.

8. The data processing system of claim 7 wherein the processor unit further executes the program code to determine, in response to an absence of a determination that the particular access request can be completed within the specified amount of time without sending the particular access request to the disk drive, whether the particular access request can be completed within the specified amount of time if the particular access request is placed within the queue in a location based on a priority of the particular access request and a priority of each access request already on the queue without sending the particular access request to the disk drive.

9. The data processing system of claim 8 wherein the processor unit further executes the program code to place the particular access request in the location within the queue if the particular access request can be completed within the specified amount of time by placing the particular access request in the location.

10. The data processing system of claim 7, wherein the queue is a request queue in the disk drive and wherein in executing the program code to add, by the drive driver, the particular access request to the queue if a determination is made that the particular access request can be completed within the specified amount of time, the processor executes the program code to send, by the device driver, the particular access request to the disk drive controller for placement in the request queue if a determination is made that the access request can be completed within the specified amount of time.

11. The data processing system of claim 7 wherein the processor unit further executes the program code to receive the particular access request from an application at a processor that is separate from the disk drive controller, wherein the device driver executes on the processor.

12. A non-transitory computer readable medium storing a computer program product for managing access requests for access to a disk drive, the computer program product comprising:
    program code, stored on the computer readable medium, for tracking, by a device driver, a placement of a set of disk heads and an expected time for the disk drive to process access requests already queued in a queue at the disk drive;
    program code, stored on the computer readable medium, for determining, responsive to receiving, at the device driver, a particular access request to access the disk drive, whether the particular access request can be completed within a specified amount of time without sending the particular access request to a disk drive controller in the disk drive;
    program code, stored on the computer readable medium, for adding, by the device driver, the particular access request to the queue if a determination is made that the particular access request can be completed within the specified amount of time;
    program code, stored on the computer readable medium, responsive to a determination that the particular access request cannot be completed within a specified amount of time without sending the particular access request to the disk drive, for sending an error message to an access requestor sending the particular access request; and
    program code, stored on the computer readable medium, for returning to a requestor the particular access request, specifying a projected amount of time in which the particular access request can be completed, wherein the projected amount of time is greater than the specified amount of time.

13. The non-transitory computer readable medium of claim 12 further comprising:
    program code, stored on the computer readable medium, responsive to an absence of a determination that the particular access request can be completed within the specified amount of time without sending the particular access request to the disk drive, for determining whether the particular access request can be completed within the specified amount of time if the particular access request is placed within the queue in a location based on a priority of the particular access request and a priority of each access request already on the queue without sending the particular access request to the disk drive.

14. The non-transitory computer readable medium of claim 13 further comprising:
    program code, stored on the computer readable medium, for placing the particular access request in the location within the queue if the particular access request can be completed within the specified amount of time by placing the particular access request in the location.

15. The non-transitory computer readable medium of claim 12, wherein the queue is a request queue in the disk drive and wherein the program code, stored on the computer readable medium, for adding, by the device driver, the particular access request to the queue for execution if a determination is made that the particular access request can be completed within the specified amount of time comprises:
    program code, stored on the computer readable medium, for sending, by the device driver, the particular access request to the disk drive controller for placement in the request queue if a determination is made that the particular access request can be completed within the specified amount of time.

16. The non-transitory computer readable medium of claim 12 further comprising:
    program code, stored on the computer readable medium, for receiving the particular access request from an application at a processor that is separate from the disk drive controller, wherein the device driver executes on the processor.

17. The non-transitory computer readable medium of claim 12 further comprising:
    program code, stored on the computer readable medium, for receiving the particular access request from an operating system in which the device driver is located.

* * * * *